United States Patent [19]

Chang et al.

[11] 4,250,541
[45] Feb. 10, 1981

[54] PUSH-PUSH RESONANT POWER INVERTER

[75] Inventors: Zung F. Chang, Flemington; Robert Minton, Piscataway, both of N.J.

[73] Assignee: RCA Corporation, New York, N.Y.

[21] Appl. No.: 101,165

[22] Filed: Dec. 7, 1979

[51] Int. Cl.³ .......................................... H02M 3/315
[52] U.S. Cl. ........................................ 363/28; 363/96; 363/135; 363/139
[58] Field of Search ...................... 363/24, 25, 27, 28, 363/31, 96, 133–135, 139; 331/113 S

[56] References Cited

U.S. PATENT DOCUMENTS

| | | | |
|---|---|---|---|
| 3,242,415 | 3/1966 | King et al. | 363/135 |
| 3,543,130 | 11/1970 | Reijnders | 363/28 |
| 3,629,683 | 12/1971 | Nuckolls | 363/27 |
| 3,842,341 | 10/1974 | Goldberg | 363/27 |
| 4,055,791 | 10/1977 | Bland et al. | 363/28 |
| 4,069,449 | 1/1978 | Farnsworth | 363/28 |
| 4,138,715 | 2/1979 | Miller | 363/28 |

OTHER PUBLICATIONS

"Design and Applications of High-Power Ultrasonic Converters Using ASCR's", A. Colens, RCA Thyristors Application Note AN-6628, 1/78.
"Operating Characteristics of Self-Commutated Sinewave SCR Converters", I. Martin, RCA Thyristors Application Note AN-6745, 11/78.

*Primary Examiner*—William M. Shoop
*Attorney, Agent, or Firm*—Samuel Cohen; Carl V. Olson

[57] ABSTRACT

A DC-to-AC inverter includes first and second resonant circuit loops each including a capacitor, a primary coil of an output circuit, a silicon control rectifier providing a current path in one direction around the loop, and a conventional diode providing a current path in the opposite direction around the loop. A DC source is connected to supply a charging current through charging chokes to the capacitors in the resonant circuit loops. The silicon control rectifiers are periodically and alternately rendered conductive each to start a cycle of oscillation in one resonant circuit loops, while the DC source provides current to charge the capacitor in the other resonant circuit loop. The charging chokes and primary coils are phased to supply voltages which add to the voltage of the DC source during the charging of the capacitors.

3 Claims, 4 Drawing Figures

PUSH-PUSH RESONANT POWER INVERTER

This invention relates to DC-to-AC power inverters by which DC power at one voltage is translated to AC power, usually at a different voltage. The AC power may then be rectified to produce DC power at the different voltage. The DC-to-DC system of the invention is useful, for example, in converting kilowatts of power at 140-volts DC to 48-volt DC in a telephone plant. The DC-to-AC system is useful for powering electronic arc welding equipment and other industrial equipment which needs high-frequency AC power.

According to an example of the invention, a capacitor in one of two resonant circuit loops is charged from the input DC source while the capacitor in the other loop is discharged. Charging chokes and the primary windings of an output transformer are poled so that voltages induced in the chokes and windings add to the input DC voltage during a capacitor charging cycle, whereby the converter operates with improved efficiency.

Figure 1:
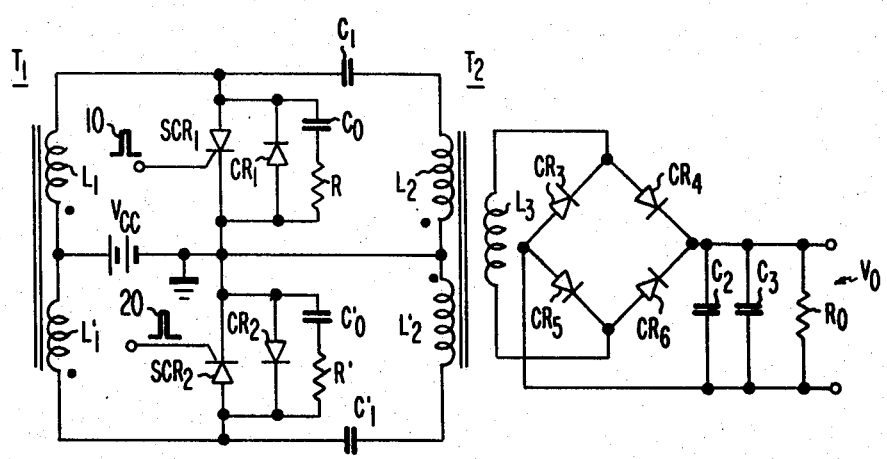
FIG. 1 is a circuit diagram of a DC-to-DC converter, including a DC-to-AC inverter, constructed according to the teachings of the invention.

Referring in greater detail to FIG. 1, there is shown a first resonant circuit loop including a capacitor $C_1$, the primary winding $L_2$ of an output transformer $T_2$, and a rectifier circuit including an asymmetrical silicon control rectifier $SCR_1$ for forward loop current in the positive direction, a conventional rectifier $CR_1$ for reverse loop current in the opposite or negative direction, and a capacitor $C_o$ and a resistor R constituting a snubber network for the purpose of minimizing the peak transient voltage and the critical rate of rise of the off-state voltage. A second resonant circuit loop includes a capacitor $C'_1$, the primary winding $L'_2$ of the output transformer $T_2$, and a rectifier circuit including an asymmetrical silicon control rectifier $SCR_2$ for loop current in the positive direction, a conventional diode $CR_2$ for loop current in the opposite negative direction, and a capacitor $C'_o$ and a resistor R'. An input voltage source represented by a battery $V_{cc}$ is connected in a charging loop for capacitor $C_1$ including a charging choke coil $L_1$ and the primary winding $L_2$. The input voltage $V_{cc}$ is also connected in a charging loop for capacitor $C'_1$ including a charging choke coil $L'_1$ and the primary winding $L'_2$. The coils $L_1$ and $L'_1$ are wound on a common core of a choke $T_1$. The coils $L_1$, $L'_1$, $L_2$ and $L'_2$ are poled as represented by the dots near the bottom ends of coils $L_1$ and $L'_1$, and near the connected ends of coils $L_2$ and $L'_2$. The coils $L_1$ and $L'_1$ are connected together in an aiding fashion, and the coils $L_2$ and $L'_2$ are connected together in a bucking fashion.

The secondary winding $L_3$ of the output transformer is connected to a conventional full-wave rectifier circuit including rectifiers $CR_3$, $CR_4$, $CR_5$ and $CR_6$, which is in turn connected to a conventional voltage-smoothing circuit including capacitors $C_2$ and $C_3$ and resistor $R_o$.

A converter according to FIG. 1 for operation at 70,000 Hz in converting 140-volt battery power to 48-volt DC may have circuit components as follows:

$L_1 = L'_1 = 250 \mu H$
$L_2 = L'_2 = L_{leakage} = 17 \mu H$
$C_1, C'_1 = 0.32 \mu F$ (1000 V)
$C_o, C'_o = 0.003 \mu F$ (1000V)
$R_o, R'_o = 120$ Ohms (10W)
$C_2 = 500 \mu F$ (100V) Electrolytic
$C_3 = 2 \mu F$ (100V) High Frequency Cap.
$SCR_1, SCR_2 = S7310M$
$CR_1 - CR_2 = D\ 2540M$
$CR_3 - CR_6 = D\ 2540A$ the input choke $T_1$ may be constructed using quadrafilar 50-36 Litz wire with two 40-turn windings put on each leg of two U-shaped cores manufactured by Indiana General (IR-8307). With a 100-mil air gap, the choke can handle 30A before saturation. The primaries of transformer $T_2$ may be comprised of two 14-turn coils made with quadrafilar 50-36 Litz wire. Over each primary coil a three-turn secondary is wound. The secondaries are then connected in series for a total of six turns. Eight strands of 50-36 Litz wire are twisted together for the secondary winding to minimize the IR drop, the IR8206 U-shaped cores are used with an air gap of 100 mils. The transformer has a leakage inductance of 17 $\mu H$, a mutual inductance of 33.7 $\mu H$ and a coupling factor of K, of 0.86. In designing the output transformer, the proper transformed value of $R_{in}$, of the output load resistance, $R_o$, must be present at the primary, where $R_o$ is determined by the output power voltage requirements and $R_{in}$ is the optimum series resistance that yields the best efficiency.

Figure 2:
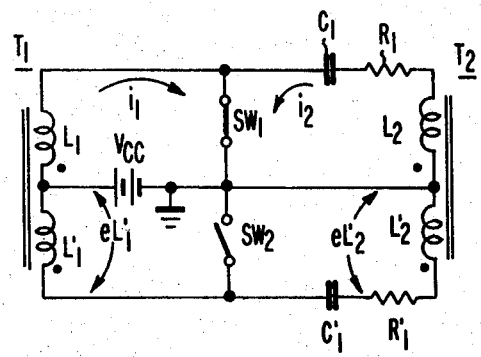
FIG. 2 is a simplified diagram which will be referred to in describing the operation of the converter of FIG. 1.

If the T-equivalent circuit of the transformer is used as shown in FIG. 2, the series $R_{in}$ and $L_{in}$ can be determined as follows:

$$Z_{in} = j\omega L_1 + \frac{\omega^2 M^2 (R_o - j\omega L_2)}{R_o^2 + \omega^2 + L_2^2}$$

$$Re|Z_{in}| = R_{in} = \frac{\omega^2 M^2 R_o}{R_o^2 + \omega^2 L_2^2}$$

For $\omega L_2 >> R_o$:

$$R_{in} = R_o \left(\frac{M}{L_2}\right)^2 = R_o K^2 \frac{L_1}{L_2}$$

where coupling coefficient $K = \dfrac{M}{\sqrt{L_1 L_2}}$ $$I_m|Z_{in}| = j\omega L_{in} = j\omega L_1 - \frac{j\omega L_2 \omega^2 M^2}{R_o^2 + \omega^2 L_2^2}$$

for $\left(\dfrac{R_o}{\omega L_2}\right)^2 << 1$ $$j\omega L_{in} = j\omega L_1 - j\omega L_2 \frac{R_{in}}{R_o}$$

$$L_{in} = L_1 - L_2 \frac{R_{in}}{R_o} = L_1 (1 - K^2)$$

Figure 3:
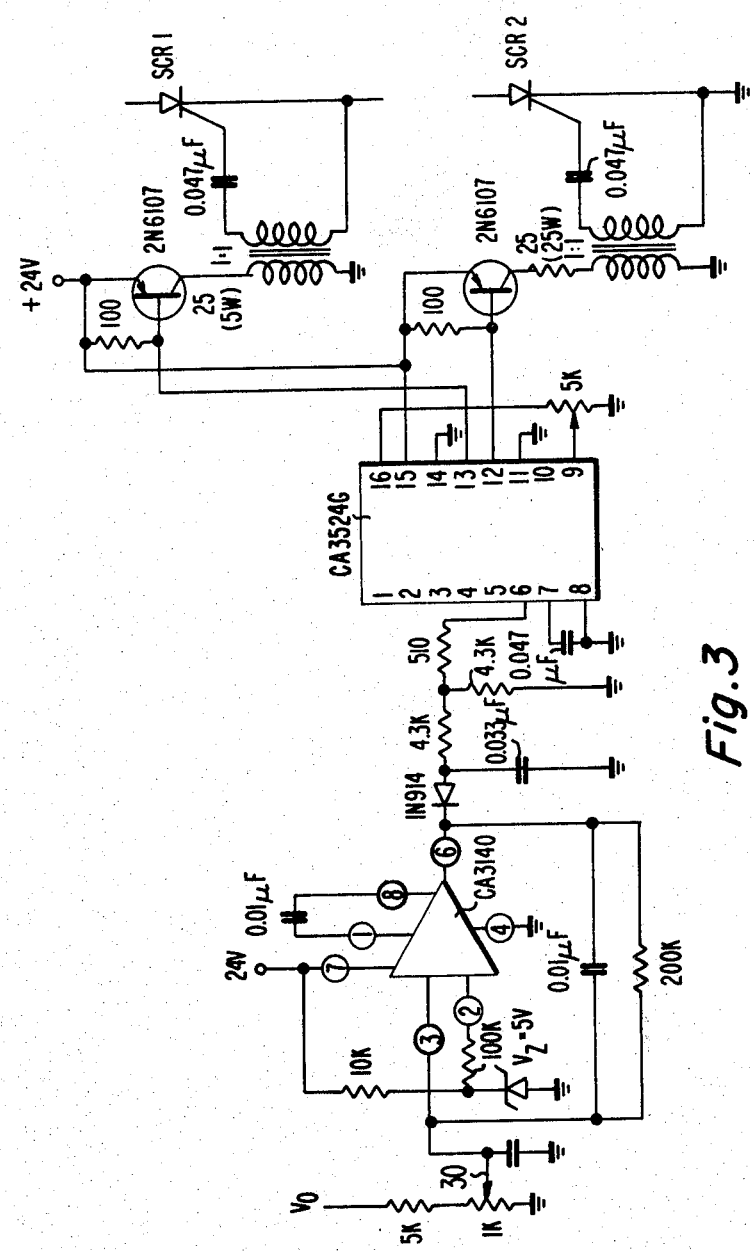
FIG. 3 is a circuit diagram of a pulse generator useful for supplying alternately-occurring pulses to the silicon control rectifiers of FIG. 1.

The asymmetrical silicon control rectifiers $SCR_1$ and $SCR_2$ are alternately rendered conductive by pulses applied to their control electrodes from a circuit which may be a gate pulse generator and voltage regulator circuit as shown in FIG. 3. The gate pulse generator utilizes one integrated circuit, CA3524G with additional 2N6107 PNP stages needed to increase the peak current to about 1A as required by the ASCR to minimize turn-on dissipation. The two outputs, for triggering the two silicon-controlled rectifiers, are activated alternately and are isolated through the use of 1:1 transformers. The generator is adjusted for a pulse width of 2μ seconds or longer.

Regulation of the output voltage $V_o$ from the DC-to-DC converter of FIG. 1 is provided by the circuit of FIG. 3 which senses the voltage at a tap 30 on a voltage divider connected across the output voltage $V_o$. The CA3140 operational amplifier is used as an active resistor in providing a changing voltage to vary the RC time constant which determines the oscillator frequency of the voltage regulator. As the load current is varied between 18.5A and 57A at a nominal output voltage of 48V, the repetition rate will change from 27 to 42 KHz to maintain voltage regulation. System efficiency with voltage regulation is 85% with light loads and decreasing to 81% at $P_o=2.5$ KW. The lower efficiency can be attributed mainly to a higher diode loss in the rectifier bridge.

The operation of the circuit of FIG. 1 will be described with references also to the simplified circuit diagram of FIG. 2 in which the silicon control rectifiers and conventional diodes are replaced by switches $SW_1$ and $SW_2$. Initially, it is assumed that the switches are open and that the capacitors $C_1$ and $C'_1$ are charged to the input voltage level $V_{cc}$. As switch $SW_1$ is closed (by an enabling pulse 10 in FIG. 4a applied to the asymmetrical silicon control rectifier $SCR_1$ in FIG. 1), input choke $L_1$ is shorted to ground causing $i_1$ in FIG. 2 to flow. Simultaneously, $C_1$ is also shorted to ground which provides a discharge path for the capacitor to dissipate its stored energy in $R_1$ through $L_2$. The combination of $C_1$, $L_2$ and $R_1$ forms a series resonant circuit whose natural frequency is $\frac{1}{2}\pi\sqrt{LC}$, assuming $R_1$ is small. During the first half cycle of oscillation, current $i_1+i_2$ shown at 12 in FIG. 4b flows through asymmetrical silicon control rectifier $SCR_1$, followed by a second half cycle of current 14 through the conventional diode $CR_1$.

Figure 4:
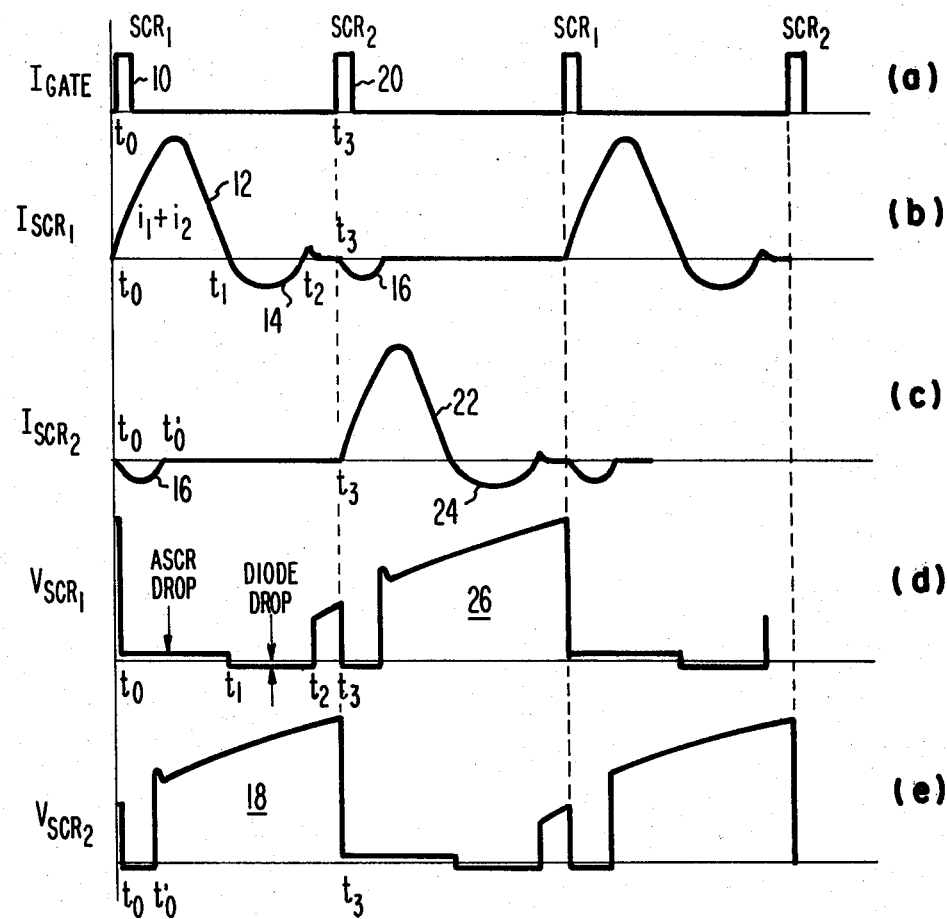
FIG. 4 is a chart of voltage waveforms which will be referred to in describing the operation of the converter of FIG. 1.

During the described first cycle of oscillation in the upper circuit including capacitor $C_1$, there is an initial small current flow 16 in FIG. 4c through switch $SW_2$, followed by a period between times $t'_o$ and $t_3$ when capacitor $C'_1$ is charged as shown at 18 in FIG. 4e. The capacitor is charged to a peak voltage equal to $V_{cc}+eL'_1+eL'_2$. All three voltages add when $L'_1$ and $L'_2$ are properly phased in the manner indicated by the dots at the ends of coils $L'_1$ and $L'_2$ in FIGS. 1 and 2.

The increased charging voltages available to $C_1$ and $C'_1$ result in higher stored energy in these capacitors. The peak charging voltage is limited by design to an amplitude not exceeding the forward blocking voltage rating the SCR.

One important advantage of the circuit is that when $SCR_1$ is fired, $SW_2$ is in the open mode with $SCR_2$ and $CR_2$ non-conducting. At time $t_o$, $C_1$ is fully charged to $V_c(max)$ while $C'_1$ is in its recharging cycle with $SW_1$ closed. This results in voltage differential that is more positive on the anode of $CR_2$ than at the cathode of $CR_2$. Consequently, $CR_2$ will conduct momentarily until $VCR_2 \leq 0.6V$ at time $t'_o$. The voltage across $SCR_2$ therefore, will show a voltage drop equal to the forward drop of $CR_2$ during the period between times $t_o$ and $t'_o$ and a voltage build-up starting at time $t'_o$ and reaching approximately $V_c(max)$ at time $t_3$, as shown in FIG. 4d.

During the interval from time $t_o$ to time $t'_o$, not only is the current through diode $CR_2$ delivered to the load, it also serves to greatly reduce the turn-off time of the SCR. When the repetition period, between time $t_o$ and $t_3$ in FIG. 4b, is decreased to be equal to or less than the period between times $t_o$ and $t_2$ the diode current 16 of $CR_2$ will be added to the diode current 14 of $CR_1$. This permits the push-push converter to be operated at a gate repetition rate equal to or greater than 50 percent of the resonant frequency as determined by $\frac{1}{2}\pi\sqrt{LC}$ which is a higher operating frequency than is possible with a push-pull circuit of the prior art.

At the end of the cycle of operation initiated by the application of pulse 10 to rectifier $SCR_1$, a pulse 20 is applied to the rectifier $SCR_2$ to initiate the oscillation 22, 24 (FIG. 4c) in the circuit including capacitor $C'_1$, while the capacitor $C_1$ in the other circuit is charged during 26 (FIG. 4d). Capacitor $C_1$ is charged to a voltage equal to $V_{cc}$ plus the voltages across inductors $L_1$ and $L_2$ because of the way in which the inductors $L_1$ and $L_2$ are poled. The upper and lower circuits operate alternately with one oscillating while the capacitor in the other is charged.

What is claimed is:

1. A DC-to-AC inverter, comprising
   an output circuit including a transformer having first and second primary coils.
   first and second resonant circuit loops each including a capacitor, one of said primary coils, a silicon control rectifier providing a current path in one direction around the loop, and a conventional diode providing a current path in the opposite direction around the loop,
   first and second charging chokes on a common core,
   a DC source connected to supply a charging current to the capacitor in said first resonant circuit loop through a charging loop path including said first charging choke and said first coil, and, to the capacitor in said second resonant circuit loop through a charging loop path including said second charging choke and said second primary coil, the charging choke and primary coil in each charging loop path being phased to supply voltages which add to the voltage of the DC source, and
   means periodically and alternately to render conductive the rectifiers in the first and second resonant circuit loops each to start a cycle of oscillation of current through the rectifier in one direction, followed by current through the diode in the opposite direction in one resonant circuit loops, while the DC source provides current to charge the capacitor in the other resonant circuit loop through the respective charging choke and primary coil.

2. A DC-to-DC converter comprising the inverter according to claim 1, and in addition, a fullwave rectifier and smoothing filter in said output circuit to provide a DC output voltage.

3. A DC-to-DC converter according to claim 2 wherein said means periodically and alternately to render conductive the silicon control rectifiers includes a voltage regulator responsive to the DC output voltage of the converter, and operative to vary the frequency at which the silicon control rectifiers are rendered conductive.

* * * * *